United States Patent [19]

Hagström

[11] 4,356,763
[45] Nov. 2, 1982

[54] CONTROL ARRANGEMENTS FOR HYDRAULICALLY-OPERATED WOOD PARTICLE OR FIBER BOARD PRESS

[75] Inventor: Hans A. R. Hagström, Karlstad, Sweden

[73] Assignee: Aktiebolaget Karlstads Mekaniska Werkstad, Karlstad, Sweden

[21] Appl. No.: 276,871

[22] Filed: Jun. 24, 1981

[30] Foreign Application Priority Data

Jun. 30, 1980 [SE] Sweden ............................ 8004805

[51] Int. Cl.³ ............................................ B30B 15/16
[52] U.S. Cl. .................................... 100/48; 100/93 P; 100/269 R; 425/167; 425/419
[58] Field of Search .................... 100/43, 48, 50, 93 P, 100/269 R; 425/148, 167, 419; 318/369

[56] References Cited

U.S. PATENT DOCUMENTS

| 3,416,433 | 12/1968 | Gutnikov et al. | 100/48 |
| 3,888,168 | 6/1975 | Kent | 100/48 |

FOREIGN PATENT DOCUMENTS

| 2544794 | 11/1979 | Fed. Rep. of Germany . | |
| 2809387 | 1/1980 | Fed. Rep. of Germany . | |
| 2925902 | 1/1981 | Fed. Rep. of Germany | 100/48 |
| 54-14078 | 2/1979 | Japan | 100/53 |
| WO80/02239 | 10/1980 | PCT Int'l Appl. . | |
| 390923 | 1/1977 | Sweden . | |
| 411935 | 2/1980 | Sweden . | |
| 415638 | 10/1980 | Sweden . | |
| 1371820 | 10/1974 | United Kingdom . | |
| 1459126 | 12/1976 | United Kingdom . | |
| 1514140 | 6/1978 | United Kingdom . | |
| 1560423 | 2/1980 | United Kingdom . | |
| 296381 | 3/1974 | U.S.S.R. | 100/48 |

Primary Examiner—Billy J. Wilhite
Attorney, Agent, or Firm—Bell, Seltzer, Park & Gibson

[57] ABSTRACT

A control circuit for controlling either the position and the speed of travel of a press table or the hydraulic pressure acting on the press table, or both, in a hydraulic press, in particular a press for wood-based boards, comprising an actual-value transmitter for the position of the press table, a pressure transmitter for the hydraulic pressure in the hydraulic press cylinder, a set point transmitter, and a control valve, actuated by the deviation of the actual value from the set point value, for the hydraulic cylinder by means of which the press table is moved. In order to produce a simple and inexpensive control circuit compared with conventional control circuits, in which the control valve is a complicated and expensive servo valve, the control valve is a pressure controlling proportional valve and the circuit can be designed to provide an arbitrary, e.g. rectilinear, control curve—with the position of the press table as a function of the time—during at least the high-pressure part of the closing sequence of the press.

16 Claims, 6 Drawing Figures

CONTROL ARRANGEMENTS FOR HYDRAULICALLY-OPERATED WOOD PARTICLE OR FIBER BOARD PRESS

FIELD OF THE INVENTION

The present invention relates to improvements in control devices in a hydraulically—operated press having a movable press table and at least one hydraulic cylinder for moving the press table, in particular a press for wood-based board, for controlling the pressing sequence during at least part of the pressing cycle.

BACKGROUND OF THE INVENTION AND PRIOR ART

Swedish Pat. No. 390,923 relates to the hot pressing of wood particle board (chipboard) in a hydraulically—operated press having a movable press table and a hydraulic cylinder for moving the press table. Connected to this press is a variable capacity hydraulic pump, which during an initial period of the press cycle is controlled by a control unit so that the hydraulic pressure in the hydraulic cylinder is a function of time. When the wood particle board to be is compressed to a thickness about 1,5 to 2 times its final thickness the control mode is changed from pressure as a function of time to thickness as a function of time. The control unit is switched out, and during a subsequent period of the pressing cycle the variable capacity hydraulic pump—and, thus, the hydraulic pressure in the hydraulic cylinder—will be controlled by the deviation of the actual thickness of the board from the set thickness thereof at each moment of said subsequent period of the pressing cycle. An actual-value transmitter is provided for delivering a signal representing the actual thickness, and a set point transmitter, that has in series a timer, an integrator, and a diode function generator, is provided for delivering a signal representing the desired thickness as a function of time. When the final thickness of the board is reached the press may be cooled to condense steam present in the board in order to prevent the board from bursting from internal steam pressure upon a too fast opening of the press. Alternatively, the press may be opened without cooling if the opening step is carried out slowly enough to permit the steam to escape between the board and the heating platens of the press while the platens prevent the board from expanding noticably.

A suitable control unit for controlling the hydraulic pressure as a function of time is stated to be disclosed in German Democratic Republic (DD) Pat. No. 70,012 and has a template, one edge of which is a graphic representation of the curve $p = f(t)$.

By means of a motor this template is moved past a follower, which over a kinematic system adjusts the positions of two contacts of a contacting pressure gauge that indicates the hydraulic pressure corresponding to the respective position of the follower. The hydraulic pressure will then pulsate between the two values determined by the positions of the contacts.

Such a control system is disadvantageous for several reasons. For example, a system having a variable capacity pump is expensive, the shape of a template is based on guesswork and has to be verified experimentally, and a precise control of the conditions when letting the steam escape between the board and the press platens is almost impossible to obtain.

Other control systems are known from other types of hydraulic presses. For example, in Federal Republic of Germany (DE) Patent Application No. 2,544,794 a press is described that is controlled with regard to end positions, in that the volume of hydraulic fluid supplied to the hydraulic cylinder from an accummulator is accurately measured.

Such a system is not satisfactory for a press for wood-based panels. Further another West-German (DE) Patent Application No. 2,809,387 describes a hydraulic die press or similar press fitted with a similar control device, in which the control valve connected to the hydraulic cylinder is a quick-operating servo valve without fixed positions. This servo valve can be opened, closed or set proportional to a control current in an extremely short time, e.g. approximately two milliseconds.

A quick control like this makes it possible to slow down a punching tool at the instant that it emerges from the blank being pressed. This technical problem is not applicable to presses for wood-based board, and a servo valve like this is complicated and expensive.

SUMMARY OF THE INVENTION

One object of the present invention is to provide a press control device that is simple and can provide at a lower cost a substantially arbitrary, e.g. rectilinear, control curve—for the position of the press table as a function of the time—during at least a part of the pressing cycle.

According to the invention, this is achieved in that the press control device comprises at least one actual-value transmitter that delivers a signal representing the actual position of the press table relative to a reference point, a set point transmitter that, at each point of time of said part of the pressing cycle, delivers a signal representing a desired position of the press table at the point of time in question, a first summation point connected to said at least one actual-value transmitter and to said set point transmitter to produce from the two signals a variance signal that represents the deviation of the actual value from the set point value, and a control valve for the hydraulic cylinder responsive to the variance signal for correcting the deviation, said control valve being a pressure controlling proportional valve, whereby the hydraulic cylinder is acted upon at every point of time during the said part of the pressing cycle by hydraulic medium at the pressure that is required at the point of time in question to keep the press table in a preprogrammed position or to move the press table at a predetermined speed, all in accordance with a substantially arbitrary control curve.

A pressure controlling proportional valve is, as is well known, a kind of pilot-operated relief valve and comprises a main valve with valve cone and a pilot valve with proportional actuator, e.g. a proportional magnet when the input signal to the actuator is an electric current. Those versed in the art will realize immediately that, by a suitable choice of proportional actuator, other electric quantities than current can also be used for the input signal, and even mechanical quantities (e.g. pneumatic pressure) can be contemplated. The proportionality of the actuator does not need to be such that the relationship between input signal and pressure set by the main valve is at least substantially linear, but a small change of input signal must give a small change of the pressure and a big change of input signal must give a big change of the pressure.

A hydraulic system always contains at least one relief valve, which is connected to a pressure line from the hydraulic pump and can be incorporated in the casing of small pumps. The relief valve limits the pressure and thereby protects the pump and the system from overloading. As a rule, small relief valves are of simple construction and therefore have a pronounced tendency to oscillate. Pilot operation is often used on large relief valves, and pilot-operated valves work smoothly and free from oscillations and with an almost constant pressure drop independent of the flow through the valve. The relief valve for a press for wood-based panels or similar is therefore suitably a pilot-operated relief valve.

By using a pressure controlling proportional valve as control valve in accordance with the invention, the advantage is obtained that the pilot valve in the pilot-operated relief valve, which will be required in any case, can easily be supplemented by a proportional actuator to inexpensively convert the pilot-operated relief valve into a pressure controlling proportional valve, with which pressure control of the press table position and speed of travel can be performed. A supplementary addition like this is considerably less expensive than the use of a servo valve as control valve or the use of a continuously variable pump. In addition, a servo valve and a variable pump are more sensitive to impurities in the hydraulic medium than a proportional valve.

Another object of the invention is to provide a press control device, which is easier to program with the desired arbitrary parameters that define a substantially arbitrary control curve for controlling the pressing sequence during at least part of the pressing cycle, and which does not require the preparation and storing of templates or the like to change from one accurate control curve back to a previous one or to change the control curve arbitrarily but yet accurately.

This object is achieved in that in one embodiment of the invention the press control device comprises at least one actual-value transmitter that delivers a signal representing the actual position of the press table relative to a reference point, a set point transmitter that, at each point of time of said part of the pressing cycle, delivers a signal representing a desired position of the press table at the point of time in question, a first summation point connected to said at least one actual-value transmitter and to said set point transmitter to produce from the two signals a variance signal that represents the deviation of the actual value from the set point value, and a control means, preferably a pressure controlling proportional valve, for the hydraulic cylinder responsive to the variance signal for correcting the deviation, said set point transmitter having means for setting a plurality of predetermined, arbitrary positions of the press table relative to the reference point, means for determining the length of travel of the press table from any one of said set positions to a subsequent one, means for setting a predetermined, arbitrary period of time, in which the press table is to be moved said length of travel, means for determining the speed of travel of the press table required for moving the press table said length of travel in said set period of time, and a ramp generator responsive to the speed of travel of the press table for delivering to the first summation point a signal indicative of the desired position of the press table at any moment during said period of time.

In some cases, the hydraulic pressure and the pressure change rate in the hydraulic cylinder are better suited than the position and the speed of travel fo the press table for controlling the pressing sequence during at least part of the pressing cycle. Then, the second object of the invention is achieved in that the press control device comprises at least one pressure transmitter that delivers a signal representing the actual hydraulic pressure in the hydraulic cylinder, a set point transmitter that, at each point of time of said part of the pressing cycle, delivers a signal representing a desired hydraulic pressure at the point of time in question, a summation point connected to said at least one pressure transmitter and to said set point transmitter to produce from the two signals a variance signal that represents the deviation of the actual value from the set point value, and a control means, preferably a pressure controlling proportional value, for the hydraulic cyclinder responsive to the variance signal for correcting the deviation, said set point transmitter having means for setting a plurality of predetermined, arbitrary hydraulic pressures, means for determining the pressure change required for going from any one of said set pressures to a subsequent one, means for setting a predetermined, arbitrary period of time, in which the hydraulic pressure is the change from said one set pressure to said subsequent pressure, means for determining the pressure change rate required for going from said one set pressure to said subsequent pressure in said set period of time, and a ramp generator responsive to the hydraulic pressure change rate for delivering to the summation point a signal indicative of the desired hydraulic pressure at any moment during said period of time.

As a rule, neither pure position and speed of travel control nor pure pressure and pressure change rate control is suited as sole control during the entire pressing cycle. To get optimum control, the two control modes should alternate during the pressing cycle in such a way that each mode is used when it is the most suitable one.

In this case the second object of the invention is achieved in that the press control device comprises at least one actual-value position transmitter that delivers a signal representing the actual position of the press table relative to a reference point, an actual-value pressure transmitter that delivers a signal representing the actual hydraulic pressure in said one cylinder, a set point transmitter that on one hand, at each point of time of the first mentioned part of the pressing cycle, delivers a signal representing a desired position of the press table at the point of time in question and on the other hand, at each point of time of said other part of the pressing cycle, delivers a signal representing a desired hydraulic pressure at the point of time in question, at least one summation point connected to said at least one actual-value position transmitter, to said actual value pressure transmitter and to said set point transmitter to produce from either of the actual-value signals and its associated set point signal a variance signal that represents the deviation of the actual value from the set point value, and a control means, preferably a pressure controlling proportional valve, for the hydraulic cylinder responsive to the variance signal for correcting the deviation, said set point transmitter having a plurality of means, each one for setting a predetermined, arbitrary position of the press table relative to the reference point, means for determining the length of travel of the press table from any one of said set positions to a subsequent one, a plurality of means, each one for setting a predetermined, arbitrary period of time, in which the press table is to be moved said length of travel, means for determining the speed of travel of the press table required for moving the press table said length of travel in said set period of time, a plurality of means, each one for setting a predetermined, arbitrary hydraulic pressure, means for determining the pressure change required for going from any one of said set pressures to a subsequent one, a plurality of means, each one for setting a predetermined, arbitrary, other period of time, in which the hydraulic pressure is to change from said one set pressure to said subsequent pressure, means for determining the pressure change rate required for going from said one set pressure to said subsequent pressure in said other set period of time, and a ramp generator on one hand responsive to the speed of travel of the press table for delivering to the summation point a signal indicative of the desired position of the press table at any moment during the first mentioned set period of time, and on the other hand responsive to the hydraulic pressure change rate for delivering to the summation point a signal indicative of the desired hydraulic pressure at any moment during the other set period of time, whereby the set point transmitter is programmable with a substantially arbitrary control curve.

To facilitate the programming even more it is suitable that the press control device further comprises a panel, said time setting means being mounted spaced from each other in a first row in said panel and both said position setting means and said pressure setting means being mounted spaced from each other in a second and a third row, respectively, in said panel, said three rows being parallel to each other, and the individual time setting means of the first row being located opposite to spaces separating the individual position setting means and the individual pressure setting means of the second and third rows, respectively. For example, the means for setting position 2 and the means for setting position 3 would be separated by a space, and opposite to this space there would be located the means for setting the period of time in which the press table were to be moved from position 2 to position 3. Such an arrangement is lucid and easy to grasp.

The invention will now be described in more detail with reference to the accompanying drawings.

DESCRIPTION OF ILLUSTRATED EMBODIMENTS

Figure 1:
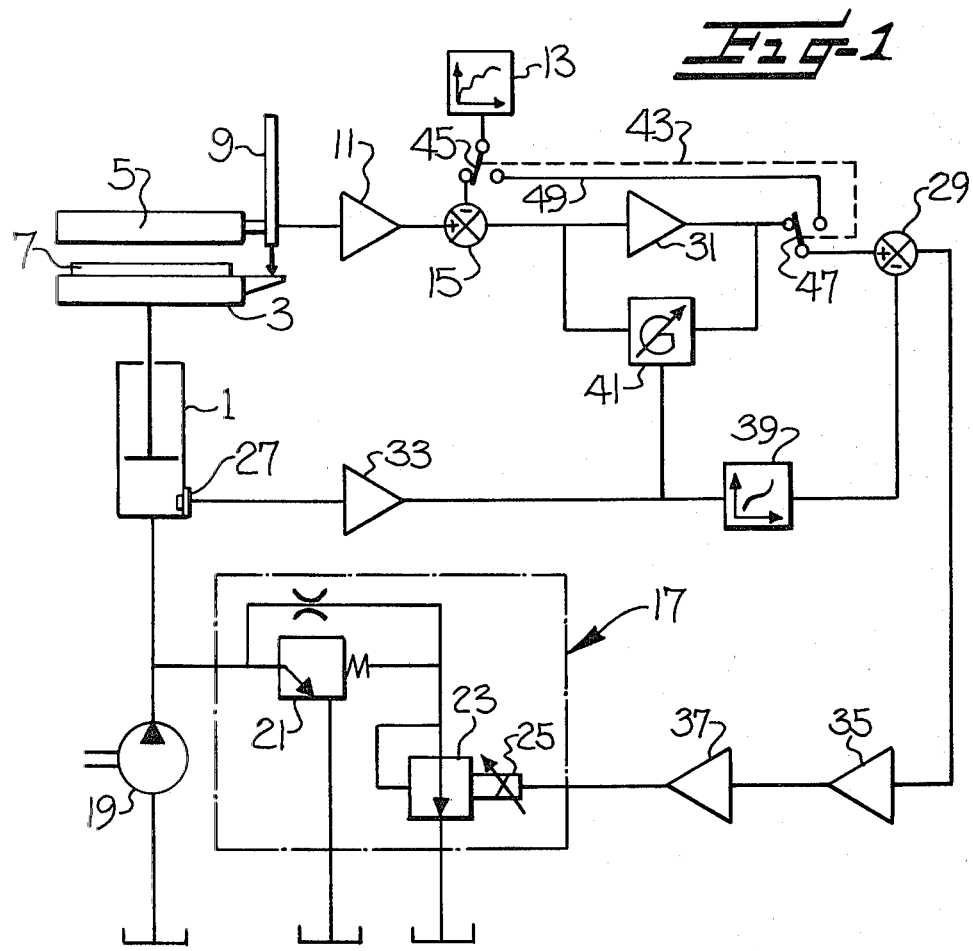
FIG. 1 is a diagram of a control system for a hydraulic press, which system includes a preferred embodiment of a press control device according to the invention.

The hydraulic press shown schematically in the drawing is a press for wood-based board and comprises a bottom piece, not shown, on which is mounted at least one hydraulic cylinder 1 supporting a vertically movable press table 3, and a yoke or top piece 5 rigidly connected to the bottom piece. In the press shown, which is a single-opening press, a mat 7 of e.g. wood chips or fibres and heat-hardening glue is resting on the press table 3. By supplying pressurized hydraulic medium to the hydraulic cylinder 1, the press table 3 is made to rise from a bottom position and compress the mat 7 to convert it into a finished board.

The press is equipped with an actual-value transmitter 9 that is capable of delivering a signal representing the actual position of the press table 3 relative to a reference point. In the embodiment shown the actual-value transmitter is a potentiometer 9, which is supported by the yoke or top piece 5 and has a tracker resting against a rib projecting from the press table 3. If desired, a linear differential transformer, for example, or any other type of actual-value transmitter can be used instead of the potentiometer 9. The output signal from the actual-value transmitter is sent through a signal conditioner or instrumentation amplifier 11 which makes the position signal less sensitive to disturbances. In practice, it is suitable to use more than one actual-value transmitter, e.g. one at each corner of the press table, and the mean value of the position signals can be taken as the output signal.

The control system includes a set point transmitter 13, which is capable of delivering at every point of time during at least a high pressure part of the closing sequence of the press and during the actual pressing a signal representing the desired position of the press table 3 at the point of time in question. The set point transmitter 13, which will be described more in detail in connection with FIGS. 4 to 6, can comprise a ramp generator, and the setting of the function parameters of this can take place, for example, digitally by means of thumb wheel switches. For the closing part of the pressing cycle, preferably a plurality, e.g. four, different press table positions with intermediate transfers can be programmed. For moving the press table 3 from a first position to a second position, the starting point, the finishing point and the time required for travelling from the first point to the second are defined. The ramp generator will then compute the inclination of the set point slope in question (length units per unit of time, i.e. the speed of travel of the press table 3).

The actual-value signal and the set point signal are brought to a first summation point 15, which produces from the two signals a variance signal representing the deviation of the actual value from the set point value. The number 17 designates a control valve, responsive to the variance signal, for the hydraulic cylinder 1 for correcting the deviation.

According to one aspect of the invention, the control valve is a pressure controlling proportional valve 17. Similar to pilot-operated relief valves, this is connected to a pressure line from a hydraulic pump 19 to the hydraulic cylinder 1 and comprises a main valve 21 with valve cone and a pilot valve 23 with a proportional actuator 25, which is a proportional magnet in the embodiment shown. The system pressure acts on the valve cone of the main valve, but at the same time also, through a throttled duct, on the back of the main valve cone, which is loaded by a relatively weak spring, and on the pilot valve cone. If the system pressure rises, i.e. the pressure in the hydraulic cylinder 1, above the pressure corresponding to the force of the proportional magnet 25, the pilot valve 23 will open. The pressure on the back of the main valve cone will thereby decrease, due to the throttling in the duct, so that the main valve cone is lifted from its seat and passes pressurized hydraulic medium to a tank.

A satisfactory positional and speed control of the press table 3 is obtained with this control system during a high-pressure part of the pressing cycle. In order to increase the control range to include the low-pressure part of the cycle, during which the mat 7 or the finished board is not being pressed against the yoke or the top piece 5, it is necessary that a pressure transmitter 27 is provided for delivering continuously a signal representing the system pressure, and that a second summation point 29 is provided for changing the variance signal, which comes from the first summation point 15, in response to the pressure signal from the transmitter 27 before the variance signal has activated the pressure controlling proportional valve 17 to change the pressure on the hydraulic medium and thus the position or speed of travel of the press table 3. Within the low pressure part of the pressing cycle, the same pressure is needed to keep the press table in a particular position (the speed will be zero) irrespective of the distance from the point in question to the said reference point.

In the embodiment shown there is also a first amplifier 31, such as a control amplifier in a PID controller, for example, connected between the summation points 15 and 29 in order to amplify the variance signal, and a second amplifier 33 in the form of an instrumentation amplifier is connected between the transmitter 27 and the second summation point 29 in order to amplify the pressure signal. These amplifications are such, in relation to the magnitude of the respective input signal, that the first amplifier 31 is capable of delivering an amplified variance signal that is stronger than the strongest possible amplified pressure signal. Thus the device is constructed so that the effect of the control amplifier 31 is never overcompensated as regards the pressure feedback signal. An overcompensation would cause the proportional valve to demand maximum pressure, and control over the control action would be lost.

The output signal from the second summation point 29 is sent through a summation amplifier 35 and is amplified in a power amplifier 37 before it is delivered to the proportional magnet 25 for adjusting the system pressure and thus the position or travel speed of the press table 3.

The proportional valve 17 preferably has a linear control characteristic, at least at pressures higher than that required to commence the compression of the mat 7, and in addition the pressure adjustment should be independent as far as possible of the flow through the valve. If the proportional valve 17 should have a non-linear control characteristic, a signal converter 39 can be connected in the line between the instrumentation amplifier 33 and the second summation point 29 and can be arranged to convert the amplified pressure signal in such a way that the non-linearity in the control characteristic is compensated. In this way the control of press table position and speed of travel will be simplified.

Figure 2:
FIGS. 2 and 3 are graphical symbols for two different, alternative embodiments of an adaptive amplification control device included in the control system shown in FIG. 1.
Figure 2:
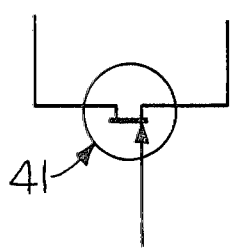
Figure 3:
Figure 3:
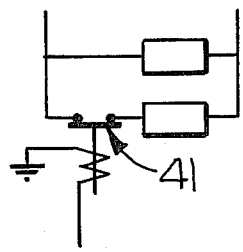

In the preferred embodiment shown the control amplifier 31 is also provided with a device 41 to control adaptively its amplification and in this way counteract a self-oscillation that can occur with positional control of the press table 3 in an unloaded press when using a loop amplification that is adapted to the damping obtained in a loaded press. As shown in FIG. 2, the adaptive amplification control device 41 can comprise a field effect transistor of MOS transistor and be arranged to deliver continuously increasing amplification at increasing pressure on the medium in the hydraulic cylinder. Alternatively, the adaptive amplification control device 41, as shown in FIG. 3, can comprise two or more resistors connected in parallel, one of which is always switched in, and the other one or ones will be switched in in response to the system pressure in such a way that the adaptive amplification control device 41 will increase the amplification by steps at increasing pressure on the hydraulic medium in the cylinder 1. Alternatively, the amplification control device 41 may comprise a multiplicator circuit, not shown, in which the output signal from the multiplicator is responsive to the product of the actual hydraulic pressure in the cylinder and the deviation of the actual position from the set position of the press table.

In FIG. 1 as described above the set point transmitter 13 delivers a set point signal, representing the desired position of the press table 3, to the first summation point 15, where the variance signal produced represents the deviation of the actual position from the set position. The variance signal is amplified in the first amplifier 31 and delivered to the second summation point 29.

The press control device illustrated in FIG. 1 also comprises a gang switch 43 having a first switch 45 in a conductor for delivering the set point signal to the first summation point 15, a second switch 47 in a conductor for delivering the amplified variance signal from the first amplifier 31 to the second summation point 29, and a bypass 49 connecting said first switch 45 to said second switch 47, so that upon actuation of the gang switch the actual-value position transmitter 9 will be disconnected from the control circuit, and the set point signal from the set point transmitter 13 will bypass the first summation point 15 and the first amplifier and go directly to the second summation point 29. Such an arrangement is preferable when it is desired to have position and travel speed control of the press table 3 during one part of the pressing cycle and control of the hydraulic pressure and pressure change rate in the cylinder 1 during another part of the pressing cycle. During said other part of the cycle the set point transmitter 13 would deliver a signal representing the desired hydraulic pressure in the cylinder 1.

Figure 4:
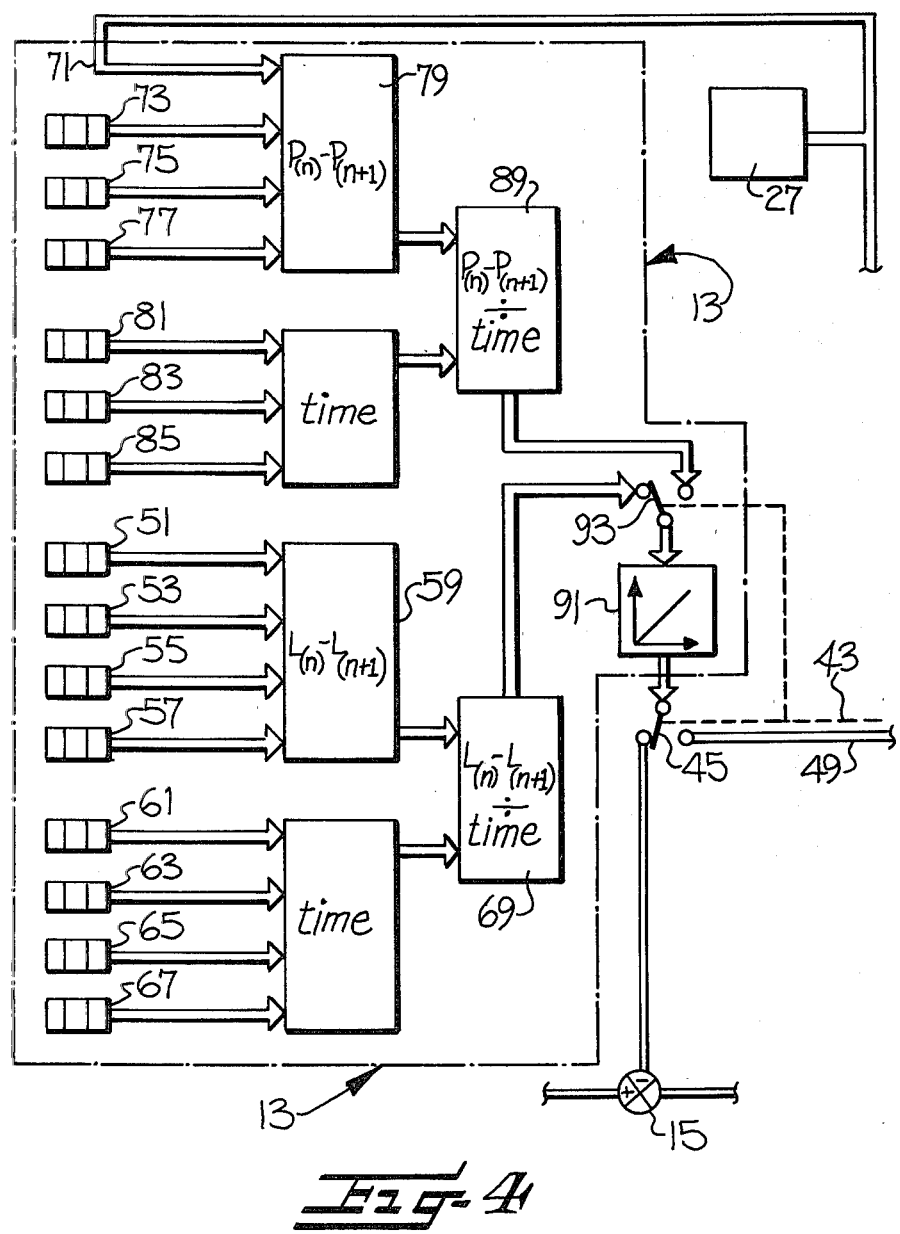
FIG. 4 is a diagram of a set point transmitter included in the press control device.

An example of a preferred embodiment of the set point transmitter 13 is illustrated schematically and diagrammatically in FIG. 4. The set point transmitter comprises a plurality of individual means 51, 52, 53, 54 (of which four are shown), each one for setting a predetermined, arbitrary position of the press table 3, means 59 for determining the length of travel of the press table 3 from any one of said set positions to a subsequent position, a plurality of individual means 61, 63, 65, and 67 (of which four are shown), each one for setting a predetermined, arbitrary period of time, in which the press table 3 is to be moved said length of travel, and means 69 for determining the speed of travel of the press table 3 required for moving the press table said length of travel in said set period of time. The preferred set point transmitter 13 further comprises a plurality of individual means 73 and 75, and 77 (of which three are shown), each one for setting a predetermined, arbitrary hydraulic pressure, means 79 for determining the pressure change required for going from any one of said set pressures to a subsequent one, a plurality of individual means 81, 83, and 85 (of which three are shown), each one for setting a predetermined, arbitrary, other period of time, in which the hydraulic pressure is to change from said one set pressure to said subsequent pressure, means 89 for determining the pressure change rate required for going from said one set pressure to said subsequent pressure in said other set period of time. In addition the set point transmitter comprises a ramp generator 91, which on one hand is responsive to the speed of travel of the press table 3 for delivering to the first summation point 15 a signal indicative of the desired position of the press table 3 at any moment during the first mentioned set period of time, and which on the other hand is responsive to the hydraulic pressure change rate for delivering to the second summation point 29 a signal indicative of the desired hydraulic pressure at any moment during the other set period of time, whereby the set point transmitter is programmable with a substantially arbitrary control curve.

To change from position and speed of travel control mode to pressure and pressure change rate control mode, or the reverse, if desired, the gang switch 43 includes a third switch 93 connected between on one hand the speed of travel determining means 69 and the ramp generator 91 and on the other hand the pressure change rate determining means 89 and the ramp generator 91. In case a period of position control is followed by a period of pressure control the change in control mode is carried out when the last one of the set positions is reached. At that very point you cannot foretell the corresponding pressure exactly. Therefore, the actual pressure as sensed by the actual pressure transmitter 27 at the moment of the change over of control mode is fed at 71 into the means 79 for determining the required pressure change, where it will constitute the starting point for the first pressure change rate ramp.

Each of the means 51-57, 61-67, 73-77, and 81-85 for setting the operating parameters may be a triple thumb wheel switch, for example, or a rotary potentiometer. If thumb wheel switches are selected, the operating mode is digital and it is suitable to use a conventional computer as the means 59 for determining the length of travel, the means 69 for determining the speed of travel, the means 79 for determining the pressure change, and the means 89 for determining the pressure change rate. With rotary potentiometers, on the other hand, the signals are not digital but analogous and the computer is an analog computer. In the latter case the ramp generator 91, which always delivers an output signal that is sensitive to the sign (i.e. positive or negative) of the input signal, may be a voltage controlled integrator, for example. With digital control mode the ramp generator 91 may comprise a pulse counter, not shown, for counting an arbitrary number of pulses. The number is variable to adjust the slope of the ramp and is inversely proportional to the speed of travel or the pressure change rate, respectively. If desired it is of course possible and it may in some cases be preferable, to let the computer form the inverse speed of travel and/or the inverse pressure change rate. Then the speed would be expressed in seconds per millimeter, for example, instead of in millimeters per second, and the pressure change rate would be expressed in seconds per megapascal, for example, instead of in megapascals per second. In addition, it is also possible, if desired, to start with digitally set parameters and to convert the digital signals into analog ones by means of a digital to analog converter, not shown. If a curved ramp is preferred over a straight one during one or more parts of the pressing cycle, the constant set time signal may be modified by or converted into part of a curve of a trigonometric function, such as sine or cosine, for example.

Figure 5:
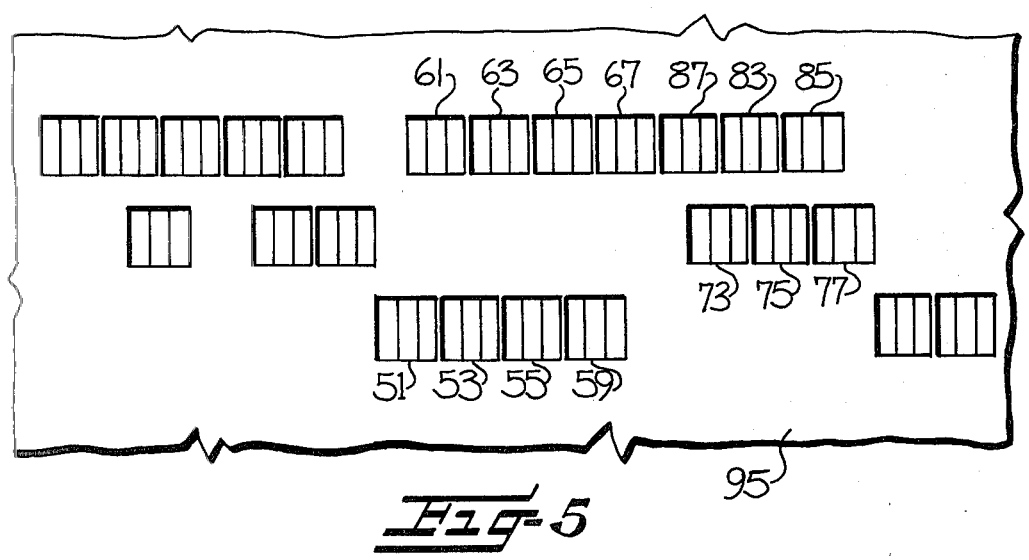
FIG. 5 is a view of a part of a control panel, in which time setting means, position setting means and pressure setting means of the set point transmitter are mounted.

FIG. 5 illustrates a portion of a control panel 95 for controlling the pressing cycle. The individual time setting means 61-67 and 81-85 are mounted spaced from each other in a first row in the panel 95. Similarly, both the individual position setting means 51-57 and the individual pressure setting means 73-77 are mounted spaced from each other in a second and a third row, respectively, in the panel 95. The three rows are parallel to each other, and the individual time setting means 61-67 and 81-85 of the first row are loacted opposite to spaces separating the individual position setting means 51-57 and the individual pressure setting means 73-77 of the second and third rows, respectively. For example, time setting means 61 is located opposite to a space separating position setting means 51 from position setting means 53, and by the means 61 the predetermined time is set, in which the press table 3 should move from the predetermined position set by the means 51 to that set by the means 53. Each one of the three rows contains additional means for setting predetermined parameters to be used for a less demanding and less sophisticated control during other parts of the pressing cycle.

Figure 6:
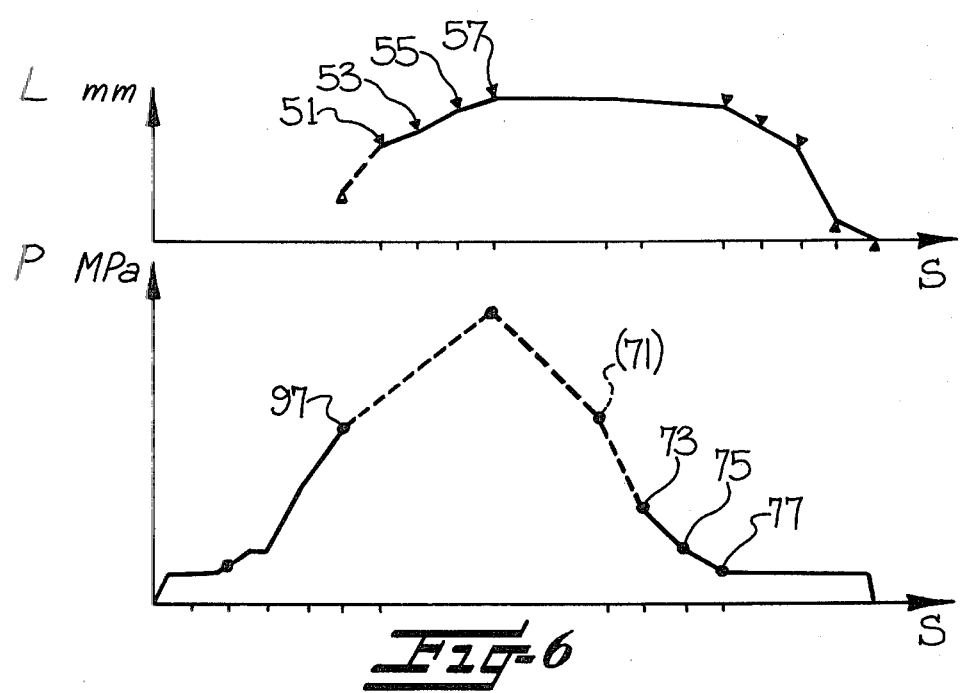
FIG. 6 is a diagrammatic representation of a typical pressing cycle carried out by means of the press control device with the set point transmitter.

FIG. 6 is a diagrammatic representation of a typical pressing cycle for the hot-pressing of wood-based board. To facilitate the understanding of the diagram, the reference numerals, which are used to indicate the individual position setting means and the individual pressure setting means in FIG. 5, are in the diagram of FIG. 6 used to denote the points that correspond to the set values. Thus, point 51 corrsponds to the value set by the position setting means 51, and so on.

During a pressing cycle the pressure is initially raised until it is high enough to start closing the press, so that the press table 3 starts moving upwards. To keep the cycle time as short as possible, the flow of hydraulic fluid into the cylinder 1 during the first part of the cycle should be at a maximum. Especially when manufacturing fiberboard, e.g. MDF, the rate of flow of hydraulic medium to the cylinder 1 should be reduced so that the press table speed of travel is low during a period around the moment when the fibrous mat 7 comes into contact with the upper hot pressing platen carried by the yoke or top piece 5. A low speed of travel during this period is necessary to avoid spoiling the mat 7 by entrainment of fibers in the displaced air. When this critical period has passed, the flow rate and the speed of travel are again increased to a maximum to bring the hydraulic pressure up to the level of point 97 in FIG. 6. The press table position 30 corresponding to the pressure at point 97 is not fixed but varies because of variations among the individual mats 7. To move the press table 3 from the position that corresponds to the pressure at point 97 to the first one of the set positions, i.e. the position at point 51, the press operator can chose one out of three, for example, slopes of the associated ramp by chosing the number of pumps to be in operation during the period in question.

During this part of the pressing cycle, high pressure is built up and when the press table 3 passes point 51 the described press control device takes over the control of the pressing sequence. At the predetermined moment when the mat 7 reaches the desired final thickness, i.e. at point 57, the pressure may be about 30 megapascals. The press control device keeps the desired thickness for a period of time set by the time setting means 67. Since the chips or similar wood particles or fibers are softened by heat from the hot pressing platens, the compression resistance of the mat 7 is reduced, so that also the pressure must be reduced to preserve the desired thickness of the mat as can be seen from the pressure curve in FIG. 6. When the pressing at a constant thickness is ended, the control mode is changed from position control to pressure control. The pressure that at the end of the time period set by the time setting means 67 corresponds to the press table position may vary, but the actual pressure is determined by means of the pressure transmitter 27 and is fed at 71 into the set point transmitter 13. Then the ramp generator can determine the pressure change rate necessary for going from the pressure at point 71 to the pressure set by the pressure setting means 73 and in the time set by the time setting means 81. At point 77 the finished board no longer is compressed between the press platens and the operating period of the described press control device is terminated.

The invention is not restricted to the preferred embodiment described above as illustrative example, but for those versed in the art a number of obvious modifications are possible within the scope of the appended claims. For example, instead of a single hydraulic cylinder 1, a plurality of cylinders can be used to move the press table 3, and an actual-value transmitter 9 can be included in a separate control circuit for each cylinder, so that the positions of the press table portions corresponding to the cylinders can be finely controlled separately. Further, the press can be a multiple opening press with one or more hot press platens movably arranged above each other between the press table 3 and the yoke or top piece 5, in that the multiple opening press is preferably designed for simultaneous closing. If desired, it is also possible to use the press control device for controlling the density profile of the finished boards. For example, you can control the pressing sequence to obtain boards having a dense skin and a less dense core or boards having a uniform density all over. For maximum versatility the press control device can, of course, include for each arbitrary period of the pressing cycle, one individual means for setting a predetermined, arbitrary position of the press table and one individual means for setting a predetermined arbitrary hydraulic pressure, and means for selecting which one of the two that should be in operation during said arbitrary period. Thereby the control mode during the pressing cycle could be either pure position and speed of travel control, or pure pressure and pressure change rate control, or even any desired alternating sequence of these two types of control mode.

I claim:

1. A device for use in a hydraulically-operated press having a movable press table and at least one hydraulic cylinder for moving the press table, for controlling both the position and the speed of travel of the press table during at least part of the pressing cycle, said device comprising at least one actual-value transmitter that delivers a signal representing the actual position of the press table relative to a reference point, a set point transmitter that, at each point of time of said part of the pressing cycle, delivers a signal representing a desired position of the press table at the point of time in question, a first summation point connected to said at least one actual-value transmitter and to said set point transmitter to produce from the two signals a variance signal that represents the deviation of the actual-value from the set point value, and a control valve for the hydraulic cylinder responsive to the variance signal for correcting the deviation, said control valve being a pressure controlling proportional valve, whereby the hydraulic cylinder is acted upon at every point of time during the said part of the pressing cycle by hydraulic medium at the pressure that is required at the point of time in question to keep the press table in a preprogrammed position or to move the press table at a predetermined speed, all in accordance with a substantially arbitrary control curve.

2. A device for use in hydraulically-operated press having a movable press table and at least one hydraulic cylinder for moving the press table, for controlling both the position and the speed of travel of the press table during at least part of the pressing cycle, said device comprising at least one actual-value transmitter that delivers a signal representing the actual position of the press table relative to a reference point, a set point transmitter that, at each point of time of said part of the pressing cycle, delivers a signal representing a desired position of the press table at the point of time in question, a first summation point connected to said at least one actual-value transmitter and to said set point transmitter to produce from the two signals a variance signal that represents the deviation of the actual value from the set point value, and a control means for the hydraulic cylinder responsive to the variance signal for correcting the deviation, said set point transmitter having means for setting a plurality of predetermined, arbitrary positions of the press table relative to the reference point, means for determining the length of travel of the press table from any one of said set positions to a subsequent one, means for settling a predetermined, arbitrary period of time, in which the press table is to be moved said length of travel, means for determining the speed of travel of the press table required for moving the press table said length of travel in said set period of time, and a ramp generator responsive to the speed of travel of the press table for delivering to said first summation point a signal indicative of the desired position of the press table at any moment during said period of time.

3. A device according to claim 2, wherein the control means is a pressure controlling proportional valve.

4. A device according to claim 1 or 3, further comprising a pressure transmitter for continuously delivering a signal representing the pressure on the hydraulic medium in the hydraulic cylinder, and a second summation point connected to said pressure transmitter and to said first summation point and operable for changing the variance signal from said first summation point in response to the pressure signal from said pressure transmitter before the variance signal acts on said pressure controlling proportional valve.

5. A device for use in a hydraulically-operated press having a movable press table and at least one hydraulic cylinder for moving the press table, for controlling the position and the speed of travel of the press table during a part of the pressing cycle and the hydraulic pressure in the cylinder as a function of press time during an other part of the pressing cycle, said device comprising
- at least one actual-value position transmitter that delivers a singnal representing the actual position of the press table relative to a reference point,
- an actual-value pressure transmitter that delivers a signal representing the actual hydraulic pressure in said one cylinder,
- a set point transmitter that on one hand, at each point of time of the first mentioned part of the pressing cycle, delivers a signal representing a desired position of the press table at the point of time in question and on the other hand, at each point of time of said other part of the pressing cycle, delivers a signal representing a desired hydraulic pressure at the point of time in question,
- at least one summation point connected to said at least one actual-value position transmitter, to said actual-value pressure transmitter and to said set point transmitter to produce from either of the actual-value signals and its associated set point signal a variance signal that represents the deviation of the actual value from the set point value, and
- a control means for the hydraulic cylinder responsive to the variance signal for correcting the deviation, said set point transmitter having a plurality of means, each one for setting a predetermined, arbitrary position of the press table relative to the reference point,
- means for determining the length of travel of the press table from any one of said set positions to a subsequent one,
- a plurality of means, each one for setting a predetermined, arbitrary period of time in which the press table is to be moved said length of travel,
- means for determining the speed of travel of the press table required for moving the press table said length of travel in said set period of time,
- a plurality of means, each one for setting a predetermined, arbitrary hydraullic pressure,
- means for determining the pressure change required for going from any one of said set pressures to a subsequent one,
- a plurality of means, each one for setting a predetermined, arbitrary, other period of time, in which the hydraulic pressure is to change from said one set pressure to said subsequent pressure,
- means for determining the pressure change rate required for going from said one set pressure to said subsequent pressure in said other set period of time, and
- a ramp generator on one hand responsive to the speed of travel of the press table for delivering to the summation point a signal indicative of the desired position of the press table at any moment during the first mentioned set period of time, and on the other hand responsive to the hydraulic pressure change rate for delivering to the summation point a signal indicative of the desired hydraulic pressure at any moment during the other set period of time, whereby the set point transmitter is programmable with a substantially arbitrary control curve.

6. A device according to claim 5, further comprising a panel, said time setting means being mounted spaced from each other in a first row in said panel and both said position setting means and said pressure setting means being mounted spaced from each other in a second and a third row, respectively, in said panel, said three rows being parallel to each other, and the individual time setting means of the first row being located opposite to spaces separating the individual position setting means and the individual pressure setting means of the second and third rows, respectively.

7. A device according to claim 6, wherein the control means is a pressure controlling proportional valve.

8. A device according to claim 7, wherein during said first-mentioned part of the pressing cycle in which the position and speed of the press table is controlled, said at least one summation point includes a first summation point connected to said actual-value position transmitter and to said set point transmitter to produce from the actual position signal and the set position signal a variance signal that represents the deviation of the actual position from the set position, and a second summation point connected to said actual-value pressure transmitter and to said first summation point to change the variance signal in repsonse to the actual pressure signal before the variance signal acts on the pressure controlling proportional valve to change the hydraulic pressure in the hydraulic cylinder and thereby the position or travel speed of the press table.

9. A device according to claim 8, including a first amplifier connected to said first summation point for amplifying the variance signal, a second amplifier connected to said pressure transmitter for amplifying the pressure signal, the amplifications being such, relative to the magnitude of the input signals, that the first amplifier is capable of delivering an amplified variance signal that is stronger than the strongest possible amplified pressure signal.

10. A device according to claim 9, wherein said first amplifier is provided with means for controlling its amplification adaptively in such a way as to counteract a self-oscillation that can occur at positional control of the press table of an unloaded press on using a loop amplification that is adapted to the damping obtained when loading the press.

11. A device according to claim 10, wherein the adaptive amplification control means includes means for continuously increasing the amplification at increasing pressure on the hydraulic medium in the hydraulic cylinder.

12. A device according to claim 10, wherein the adaptive amplification control means includes means for increasing the amplification by steps at increasing pressure on the hydraulic medium in the hydraulic cylinder.

13. A device for use in a hydraulically-operated press having a movable press table and at least one hydraulic cylinder for moving the press table, for controlling the hydraulic pressure in the cylinder as a function of press time during at least part of the pressing cycle, said device comprising at least one pressure transmitter that delivers a signal representing the actual hydraulic pressure in the hydraulic cylinder,
- a set point transmitter that, at each point of time of said part of the pressing cycle, delivers a signal representing a desired hydraulic pressure at the point of time in question,
- a summation point connected to said at least one pressure transmitter and to said set point transmitter to produce from the two signals a variance signal that represents the deviation of the actual value from the set point value, and
- a control means for the hydraulic cylinder responsive to the variance signal for correcting the deviation, said set point transmitter having means for setting a plurality of predetermined, arbitrary hydraulic pressures, means for determining the pressure change required for going from any one of said set pressures to a subsequent one, means for setting a predetermined, arbitrary period of time, in which the hydraulic pressure is to change from said one set pressure to said subsequent pressure, means for determining the pressure change rate required for going from said one set pressure to said subsequent pressure in said set period of time, and a ramp generator responsive to the hydraulic pressure change rate for delivering to the summation point a signal indicative of the desired hydraulic pressure at any moment during said period of time.

14. A device according to claim 13, wherein the control means is a pressure controlling proportional valve.

15. A device according to any one of claims 1, 3, 7 or 14, wherein said proportional valve has a linear control characteristic.

16. A device according to any one of claims 3, 7 or 14, wherein said proportional valve has a non-linear control characteristic, and including a signal converter connected to said pressure transmitter for converting the signal representing the pressure on the hydraulic medium in the hydraulic cylinder in such a way as to compensate for the non-linearity of the control characteristic.

* * * * *